US012204908B2

(12) United States Patent
Evers et al.

(10) Patent No.: US 12,204,908 B2
(45) Date of Patent: Jan. 21, 2025

(54) STORING INCIDENTAL BRANCH PREDICTIONS TO REDUCE LATENCY OF MISPREDICTION RECOVERY

(71) Applicant: ADVANCED MICRO DEVICES, INC., Santa Clara, CA (US)

(72) Inventors: Marius Evers, Santa Clara, CA (US); Douglas Williams, Santa Clara, CA (US); Ashok T. Venkatachar, Santa Clara, CA (US); Sudherssen Kalaiselvan, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/997,344

(22) Filed: Jun. 4, 2018

(65) Prior Publication Data

US 2019/0369999 A1     Dec. 5, 2019

(51) Int. Cl.
  *G06F 9/38*       (2018.01)
  *G06F 9/30*       (2018.01)

(52) U.S. Cl.
  CPC ........ *G06F 9/3806* (2013.01); *G06F 9/30058* (2013.01); *G06F 9/3844* (2013.01)

(58) Field of Classification Search
  CPC .. G06F 9/3806; G06F 9/30058; G06F 9/3842; G06F 9/3844; G06F 9/3861
  USPC ......................................... 712/235, 238, 239
  See application file for complete search history.

(56) References Cited

U.S. PATENT DOCUMENTS

| 4,991,080 | A | * | 2/1991 | Emma ................... | G06F 9/3804 |
|           |   |   |        |                         | 712/206     |
| 5,353,421 | A |   | 10/1994 | Emma et al.            |             |
| 5,848,433 | A | * | 12/1998 | Tran ..................... | G06F 9/3806 |
|           |   |   |        |                         | 711/137     |

(Continued)

FOREIGN PATENT DOCUMENTS

CN        107102845        8/2017

OTHER PUBLICATIONS

Seznec et al., "Effective ahead pipelining of instruction block address generation," 30th AISCA, 2003. Proceedings, pp. 241-252, Retrieved from the internet on Dec. 19, 2019 at <https://ieeexplore.ieee.org/document/1207004>DOI :<10.1109/ISCA.2003.1207004>.*

(Continued)

*Primary Examiner* — Shawn Doman

(57) ABSTRACT

A branch predictor predicts a first outcome of a first branch in a first block of instructions. Fetch logic fetches instructions for speculative execution along a first path indicated by the first outcome. Information representing a remainder of the first block is stored in response to the first predicted outcome being taken. In response to the first branch instruction being not taken, the branch predictor is restarted based on the remainder block. In some cases, entries corresponding to second blocks along speculative paths from the first block are accessed using an address of the first block as an index into a branch prediction structure. Outcomes of branch instructions in the second blocks are concurrently predicted using a corresponding set of instances of branch conditional logic and the predicted outcomes are used in combination with the remainder block to restart the branch predictor in response to mispredictions.

17 Claims, 8 Drawing Sheets

(56) References Cited

U.S. PATENT DOCUMENTS

| | | | | |
|---|---|---|---|---|
| 5,903,750 | A | * | 5/1999 | Yeh .................... G06F 9/30061 712/236 |
| 6,502,188 | B1 | * | 12/2002 | Zuraski, Jr. ........... G06F 9/3806 712/234 |
| 6,976,156 | B1 | * | 12/2005 | Nguyen .............. G06F 9/30145 712/219 |
| 7,620,804 | B2 | * | 11/2009 | Kuo ...................... G06F 9/3822 712/234 |
| 8,578,140 | B2 | * | 11/2013 | Yokoi ................... G06F 9/3806 712/239 |
| 2002/0073301 | A1 | | 6/2002 | Kahle |
| 2004/0034762 | A1 | | 2/2004 | Kacevas |
| 2005/0050309 | A1 | | 3/2005 | Yamashita et al. |
| 2005/0223200 | A1 | * | 10/2005 | Tremblay ............ G06F 9/30105 712/235 |
| 2005/0268075 | A1 | | 12/2005 | Caprioli et al. |
| 2007/0101110 | A1 | | 5/2007 | Kishore et al. |
| 2007/0204137 | A1 | | 8/2007 | Tran |
| 2008/0004670 | A1 | | 1/2008 | McVenes et al. |
| 2008/0077781 | A1 | * | 3/2008 | Smith ................. G06F 9/30058 712/239 |
| 2008/0162908 | A1 | | 7/2008 | Luick |
| 2008/0209190 | A1 | * | 8/2008 | Bhargava .............. G06F 9/3844 712/240 |
| 2009/0063819 | A1 | | 3/2009 | Doing et al. |
| 2009/0193231 | A1 | | 7/2009 | Gschwind et al. |
| 2009/0210683 | A1 | | 8/2009 | Caprioli |
| 2011/0225401 | A1 | * | 9/2011 | Emma ................... G06F 9/3844 712/240 |
| 2013/0117535 | A1 | * | 5/2013 | Venkumahanti ...... G06F 9/3806 712/E9.056 |
| 2013/0198490 | A1 | | 8/2013 | Tran et al. |
| 2014/0201508 | A1 | | 7/2014 | Busaba et al. |
| 2016/0034280 | A1 | * | 2/2016 | Bonanno .............. G06F 9/3848 712/240 |
| 2017/0083333 | A1 | * | 3/2017 | Choudhary ......... G06F 9/30058 |
| 2017/0090935 | A1 | * | 3/2017 | Falsafi ................. G06F 9/3857 |
| 2017/0123797 | A1 | | 5/2017 | Friedmann et al. |
| 2017/0262287 | A1 | * | 9/2017 | Abdallah ............. G06F 9/3806 |
| 2019/0303161 | A1 | | 10/2019 | Nassi et al. |
| 2020/0201651 | A1 | | 6/2020 | Jumani et al. |

OTHER PUBLICATIONS

International Search Report and Written Opinion mailed Sep. 4, 2019 for International Application No. PCT/US2019/033511, 11 pages.

Seznec, Andre, et al., "Effective Ahead Pipelining of Instruction Block Address Generation", 30th Annual International Symposium on Computer Architecture, Jun. 9-11, 2003, San Diego, CA, 12 pages.

Seznec, Andre, et al., "Multiple-Block Ahead Branch Predictors", Institute National de Recherche en Informatique et en Automatique, No. 2825, Mar. 1996, 30 pages.

U.S. Appl. No. 17/012,833, filed Sep. 4, 2020 listing Venkatachar, Ashok T. as first inventor, entitled, "Alternate Path for Branch Prediction Redirect,", 50 pages.

Seznec, Andre, "A 256 Kbits L-TAGE branch predictor", IRISA/INRIA/HIPEAC, 6 pages.

International Preliminary Report on Patentability issued Dec. 17, 2020 in Application No. PCT/US2019/033511, 8 pages.

Non-Final Office Action mailed Jun. 23, 2021 in U.S. Appl. No. 17/012,833.

Final Office Action mailed Nov. 15, 2021 for U.S. Appl. No. 17/012,833, 11 pages.

International Search Report and Written Opinion mailed Dec. 9, 2021 for PCT/US2021/047705, 10 pages.

Extended European Search Report mailed Jan. 24, 2022 for 19814382.8, 9 pages.

Final Office Action issued in U.S. Appl. No. 17/012,833, mailed Sep. 4, 2022, 9 pages.

Non-Final Office Action issued in U.S. Appl. No. 17/012,833 mailed Jun. 8, 2022, 8 pages.

Non-Final Office Action mailed Jun. 8, 2022 for U.S. Appl. No. 17/012,833, 8 pages.

Office Action mailed Sep. 7, 2022 for Indian Application No. 202017052859, 7 pages.

International Preliminary Report on Patentability issued in Application No. PCT/US2021/047705, mailed Mar. 16, 2023, 7 Pages.

Office Action issued in Japanese Application No. 2020-567762, mailed Dec. 19, 2023, 5 pages.

Japanese Office Action issued in Application No. 2020-567762, mailed Jun. 20, 2023, 10 pages.

Non-Final Office Action issued in U.S. Appl. No. 17/012,833, mailed Oct. 12, 2023, 18 pages.

Final Office Action issued in U.S. Appl. No. 17/012,833, mailed Mar. 12, 2024, 22 pages.

Office Action issued in European Application No. 19814382.8, mailed Mar. 11, 2024, 5 pages.

Office Action issued in Korean Application No. 10-2021-7000083, mailed Jul. 18, 2024, 6 pages.

Office Action issued in European Application No. 19814382.8, mailed Nov. 26, 2024, 5 pages.

Office Action issued in Chinese Application No. 201980046035, mailed Oct. 24, 2024, 6 pages.

\* cited by examiner

STORING INCIDENTAL BRANCH PREDICTIONS TO REDUCE LATENCY OF MISPREDICTION RECOVERY

BACKGROUND

Processing units use branch prediction to guess the outcome of a branch instruction so that the processing unit can begin speculatively executing subsequent instructions along the predicted branch before the processing unit has evaluated the branch instruction. The processing unit uses information in a branch prediction structure to predict the outcome of the branching instruction. For example, the processing unit can predict the outcome of conditional branch instructions that implement software constructs such as if-then-else and case statements. Examples of branch prediction structures include indirect branch predictors that redirect the flow of the program to an arbitrary instruction, a return address stack that includes return addresses for subroutines executing on the processing unit, conditional branch predictors that predict the direction (taken or not taken) of a conditional branch, and a branch target buffer that includes information predicting the location, type, and target addresses of branching instructions.

Some implementations of branch prediction structures use a branch history of results of branching instructions executed by processes that were previously, or are currently, executing on the processing unit as part of the prediction algorithm. For example, if a branching instruction previously directed the program flow to a first address 90% of the time and a second address 10% of the time, a corresponding entry in the branch prediction structure predicts that the branching instruction will direct the program flow to the first address, thereby allowing the process to speculatively execute instructions along the branch beginning at the first address without waiting for evaluation of the branching instruction. If the predicted branch turns out to be incorrect when the branching instruction is evaluated, speculative execution along the incorrectly predicted branch is suspended and the state of the processing unit is rolled back to the state at the branching instruction to begin executing along the correct branch. More specifically, both the branch prediction unit and the fetch unit are rolled back to process from the correct target of the branch, or the address after the branch if the branch was not taken.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
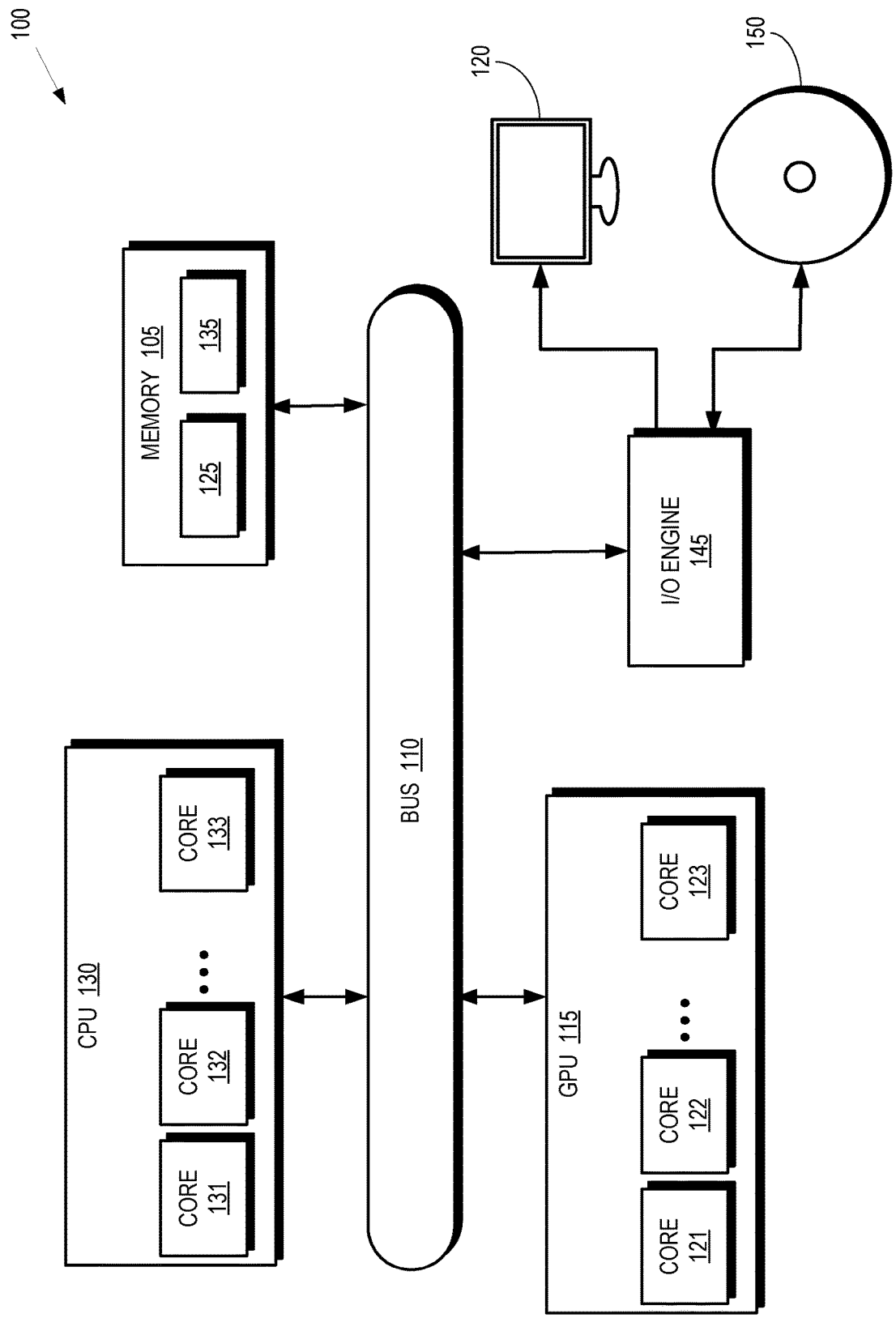
FIG. 1 is a block diagram of a processing system according to some embodiments.

Some embodiments of processing units execute multiple instructions concurrently, e.g., a processing unit could execute 4-8 instructions per cycle. A branch predictor therefore concurrently predicts outcomes of multiple branch instructions within an instruction block (which is referred to herein as a prediction block) that includes the branch instructions. The prediction block begins at a start address such as a boundary address or a target address of a previous branch instruction. The prediction block ends at an ending address such as a subsequent boundary address (e.g., an address that corresponds to a 64 byte cache line boundary) or an address of a first taken branch instruction in the prediction block. If the branch predictor is configured to concurrently predict outcomes of two branch instructions, the branch predictor uses an address of the prediction block as an index into a prediction structure (such as a branch target buffer, BTB) that stores addresses of the two branches, types of the two branches, target addresses of the taken branches, and an indication of whether any additional branch instructions are in the prediction block.

The branch predictor instructs fetch logic to fetch instructions along a path predicted by the outcomes of the two branch instructions. For example, if the first branch instruction is not taken, the branch predictor instructs the fetch logic to fetch instructions along a path including the second branch instruction so that the program flow proceeds sequentially to the second branch instruction. The branch predictor then instructs the fetch logic to fetch subsequent instructions based on the predicted outcome of the second branch instruction. However, if the branch predictor predicts that the first branch instruction is taken, the program does not flow to the second branch instruction and the prediction information generated for the second branch instruction is discarded. In some cases, the branch predictor mispredicts the outcome of the first branch instruction, which causes the processing unit to roll back to the state at the branch instruction and then execute instructions along the sequential path that includes the second branch instruction. However, the second branch prediction information is no longer available to the branch predictor, which must recompute the predicted outcome of the second branch instruction. Recomputing the predicted outcome of the second branch instruction increases latency in the branch prediction pipeline.

In "predict ahead" techniques, an address of a first block is used as an index for accessing information in a branch prediction structure and a branch predictor storage. The information includes a set of entries corresponding to a set of potential subsequent blocks that are targets of branch instructions in the first block. One subset of entries is selected from the set in response to the branch predictor predicting an outcome of the branch instructions in the first block. The predicted outcome indicates a second block including branch instructions corresponding to the subset of entries that includes branch prediction information for the branch instructions in the second block. The branch predictor uses the information in the subset of the entries to predict outcomes of the branch instructions in the second block prior to a determination of whether the outcome of the first block was correctly predicted. The predicted address of the second block is used as an index to information that is used to predict outcomes of branch instructions in a third block at an address predicted as an outcome of one of the branch instructions in the second block. If the branch outcomes or targets of the first block were mispredicted, the processing unit is rolled back to the state at the end of the mispredicted branch instruction in the first block and begins execution along the correct path. If the incorrect prediction was that the branch instruction was "not taken" and the actual branch outcome was "taken," the correct path begins at another one of the set of potential subsequent blocks that are targets of the branch instructions in the first block. If the incorrect prediction was that the branch instruction was "taken" and the actual branch outcome was "not taken," the remaining portion of the first block is predicted and fetched before moving on to the second block. Thus, if the initial branch prediction of the first block is incorrect, the processing unit is required to roll back the branch predictor based on the correct path and recompute the predicted outcome of the second block, which increases the latency of the branch predictor.

FIGS. 1-9 disclose techniques for reducing branch prediction latency by concurrently predicting a first outcome of a first branch instruction and a second outcome of a second branch instruction. The branch predictor instructs fetch logic to begin fetching instructions for speculative execution along a path indicated by the first outcome. The branch predictor also stores the second predicted outcome, which is also referred to herein as the remainder block prediction. In the absence of a second branch instruction, the remainder block prediction stores information indicating that there is no additional branch in the remainder block until a subsequent memory boundary. In response to a misprediction of the first outcome of the first branch instruction, the fetch unit is restarted at the correct target of the first branch and the branch predictor is restarted based on the target of the stored second predicted outcome, which saves time by not having to re-predict the second branch. The remainder block prediction is injected into a later stage of the branch prediction pipeline so it can be communicated to the rest of the processor logic for use in fetching, decoding, and confirming the branch prediction as per normal mechanisms. Furthermore, the remainder block is generated and stored as a byproduct of the pipeline flow that is used to perform the original branch prediction. The branch prediction pipeline is therefore rolled back and restarted without requiring the branch predictor launch extra flows down the pipeline, either concurrently with the primary flow or in response to the misprediction.

In some embodiments, the first and second branch instructions are in a prediction block that is processed by an instance of the branch predictor that concurrently processes the first and second branch instructions. The remainder block including the second predicted outcome is stored in response to the first outcome indicating a prediction along a "taken" path that does not include the second branch instruction. In response to a misprediction, the branch predictor begins branch prediction at one of three addresses: (1) a target address of the second branch instruction if the second outcome indicates that the branch is taken, (2) an address of an instruction subsequent to the second branch instruction in the prediction block if a third branch instruction is in the prediction block, and (3) a subsequent memory boundary if no additional branch instructions are in the prediction block. Some embodiments of the branch predictor store information indicating whether a third branch instruction is in the prediction block. The fetch unit is restarted at the correct target of the first branch, which in this case is the sequential address to the first branch.

In some embodiments, the branch predictor uses an address of a first block as an index for accessing information in a branch prediction structure and a branch predictor storage. The information includes a set of entries corresponding to a set of second blocks that are potentially the targets of branch instructions in the first block or the block that follows the first block if all branches in the first block are predicted not taken. The branch predictor predicts that the outcome of the branch instructions in the first block will be one of the second blocks and the processing unit begins execution of instructions in the predicted second block. However, instead of a single copy of the branch predictor conditional logic that only predicts outcomes of the predicted second block, multiple copies of the branch predictor conditional logic are instantiated to predict outcomes of branch instructions concurrently in the predicted second block and the alternate second blocks in the set. One alternate second block exists for each potential outcome of the first block. In some embodiments, each block holds up to two branches and there are three possible predicted outcomes for the first block: (1) first branch taken, (2) first branch not taken and second branch taken, or (3) both first and second branches not taken. The three possible second blocks correspond to the three predicted outcomes.

When the prediction for the first block has been made, one of the three possible second blocks is chosen as the predicted second block and the other two are considered the alternate predictions. Multiple instances of the conditional logic for the branch prediction structure use branch prediction information from the set of entries corresponding to the set of second blocks to predict outcomes of the branch instructions in the (predicted and alternate) second blocks prior to a determination of the prediction of the first block. In response to the predicted outcome of the branch instructions in the first block indicating the predicted second block, the address of the predicted second block is used as an index into the branch prediction structure in the branch predictor storage for a third block. The branch predictor also stores the alternate predictions for the second block. In response to a misprediction of the outcome of the first block being discovered by the execution unit, the fetch unit is restarted at the correct target of the first block and the branch predictor is restarted based on the target of the stored alternate second block predicted outcome, which saves time by not having to re-predict the remainder first block prediction and second block prediction. The remainder first block prediction (if applicable) and the second block prediction are injected into a later stage of the branch prediction pipeline so they can be communicated to the rest of the processor logic for use in fetching, decoding, and confirming the branch prediction as per normal mechanisms. The first block has a remainder block prediction if it was predicted taken but determined at execution time to be not taken.

FIG. 1 is a block diagram of a processing system 100 according to some embodiments. The processing system 100 includes or has access to a memory 105 or other storage component that is implemented using a non-transitory computer readable medium such as a dynamic random access memory (DRAM). However, in some cases, the memory 105 is implemented using other types of memory including static random access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that renders images for presentation on a display 120. For example, the GPU 115 renders objects to produce values of pixels that are provided to the display 120, which uses the pixel values to display an image that represents the rendered objects. The GPU 115 implements a plurality of processor cores 121, 122, 123 (collectively referred to herein as "the processor cores 121-123") that execute instructions concurrently or in parallel. The number of processor cores 121-123 implemented in the GPU 115 is a matter of design choice. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. The number of processor cores 131-133 implemented in the CPU 130 is a matter of design choice. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 is able to communicate with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

Figure 2:
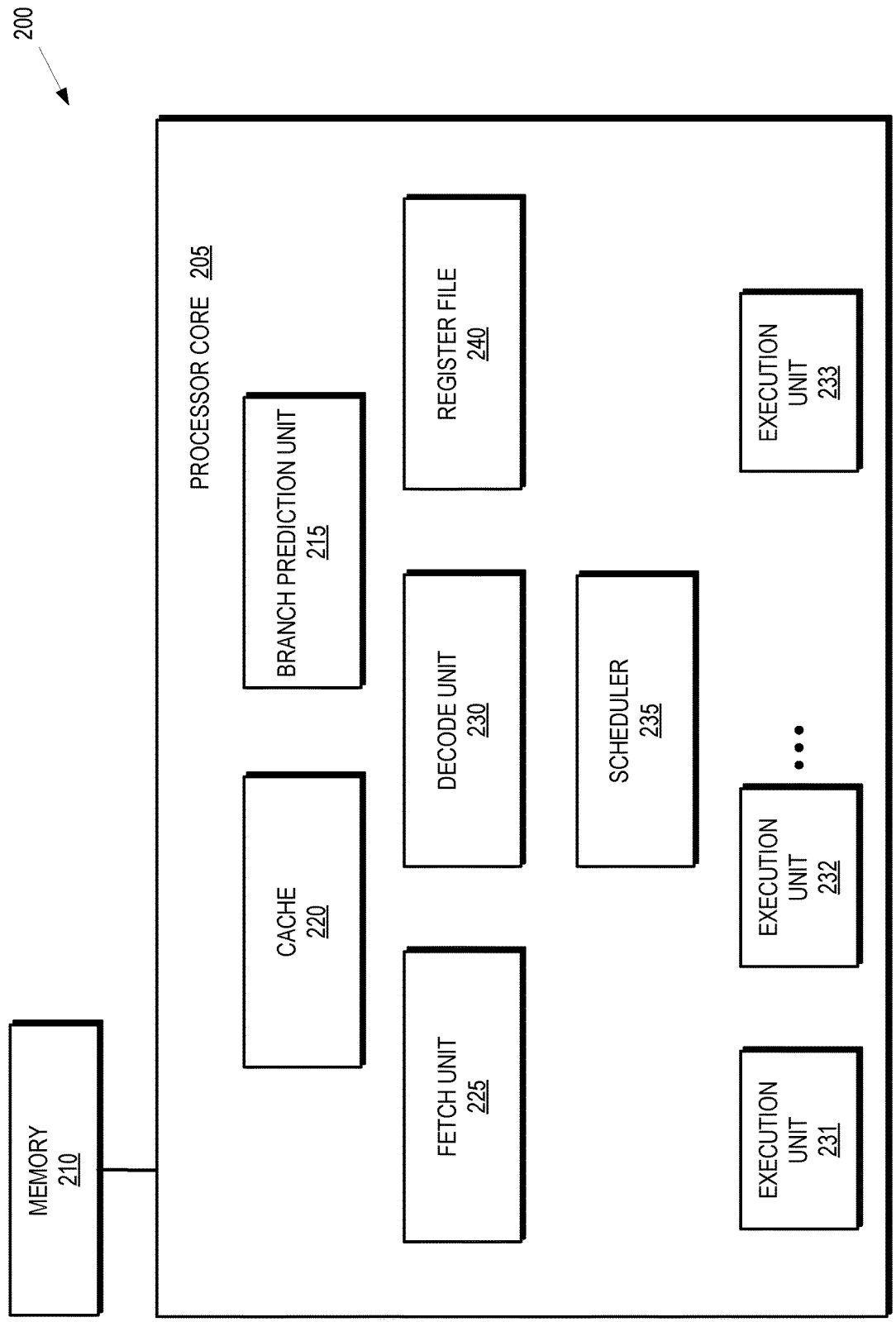
FIG. 2 is a block diagram of a portion of a processing system that includes a processor core according to some embodiments.

FIG. 2 is a block diagram of a portion 200 of a processing system that includes a processor core 205 according to some embodiments. The processor core 205 is used to implement some embodiments of the processor cores 121-123, 131-133 shown in FIG. 1. The portion 200 of the processing system also includes a memory 210 that is used to implement some embodiments of the memory 105 shown in FIG. 1. The processor core 200 includes a branch prediction unit 215 that includes conditional branch predictor storage and conditional branch prediction logic. The conditional branch predictor storage stores addresses of locations in the memory 210 and the conditional branch prediction logic predicts outcomes of branch instructions, as discussed in detail below. Copies of some of the information stored in the memory 210 are also stored in a cache 220. For example, frequently accessed instructions are stored in cache lines or cache blocks of the cache 220.

A fetch unit 225 fetches information, such as instructions, from the memory 210 or the cache 220 based on addresses received from the branch prediction unit 215. The fetch unit 225 reads the bytes representing the instructions from cache 220 or memory 210 and sends the instruction to a decode unit 230. The decode unit 230 examines the instruction bytes and determines the function of the instruction. The decode unit 230 translates (i.e., decodes) the instruction to generate a series of operations that are to be performed by the processor core 205. These operations are written to a scheduler 235. The scheduler 235 determines when source values for an operation are ready and sends the source values to one or more execution units 231, 232, 233, which are collectively referred to herein as "the execution units 231-233," to perform the operation. The result is written back to a register file 240.

Some embodiments of the branch prediction unit 215 include entries associated with the branch instructions that have been previously executed by the current process or a process that previously executed on the processor core 205. Branch prediction information stored in each entry of the branch prediction unit 215 indicates a likelihood that the branch instruction directs the program flow to an address of an instruction. The entries in the branch prediction unit 215 are accessed based on an address of the corresponding branch instruction. For example, the values of the bits (or a subset thereof) that represent a physical address, a virtual address, or a cache line address of the branch instruction are used as an index into the branch prediction unit 215. For another example, hashed values of the bits (or a subset thereof) is used as the index into the branch prediction unit 215. Examples of branch prediction structures include an indirect branch predictor, a return address stack, a branch target buffer, a conditional branch predictor, a branch history, or any other predictor structure that is used to store the branch prediction information.

The scheduler 235 schedules execution of the instructions by the processor core 205. Some embodiments of the scheduler 235 perform speculative execution of instructions following a branch instruction that redirects the program flow to an instruction at an address in the memory 210 (or related cache 220) that is indicated by the branch instruction. Branch instructions include conditional branch instructions that redirect the program flow to an address dependent upon whether a condition is true or false. For example, conditional branch instructions are used to implement software constructs such as if-then-else and case statements. Branch instructions also include unconditional branch instructions that always redirect the program flow to an address indicated by the instruction. For example, a JMP instruction always jumps to an address indicated by the instruction. In some cases, the target address is provided in a register or memory location so the target can be different each time the branch is executed. Such branches are called indirect branches.

Some embodiments of the scheduler 235 use the returned branch prediction information to predict a destination address for the branch instruction. The processor core 205 is then able to speculatively execute an instruction at the destination address, as well as subsequent instructions along the predicted branch of the program flow. If the predicted branch turns out to be incorrect when the branch instruction is evaluated, speculative execution along the incorrectly predicted branch is suspended and the state of the processor core 205 is rolled back to the state at the branch instruction to begin executing along the correct branch.

Conditional prediction logic in the branch prediction unit 215 concurrently predicts outcomes of branch instructions within a prediction block. In some embodiments, the branch prediction unit 215 concurrently predicts first and second outcomes of first and second branches in a first block of instructions. The fetch unit 225 fetches instructions for speculative execution along a first path indicated by the first outcome. If the branch prediction unit 215 predicts that the first branch instruction is taken, in which case the program flow does not encounter the second branch instruction, the predicted outcome for the second branch instruction is typically discarded. However, in the illustrated embodiment, the second outcome is stored in an alternate prediction storage array in the branch prediction unit 215 in response to the first outcome being taken. In response to a misprediction by the branch prediction unit 215, i.e. the branch prediction unit 215 predicted that the first branch instruction would be taken but the actual outcome was that the first branch instruction was not taken, the branch prediction unit 215 is restarted based on the stored second predicted outcome. In some embodiments, the conditional branch logic in the branch prediction unit 215 accesses entries in the conditional branch predictor storage corresponding to second blocks along speculative paths from the first branch instruction or the second branch instruction using an address of the first block as an index into the conditional branch predictor storage. The branch prediction unit 215 then concurrently predicts outcomes of branch instructions in the set of second blocks using a corresponding set of instances of branch conditional prediction logic. The alternate predictions for the second block are stored in the alternate prediction storage array in the branch prediction unit 215 and are used to restart the branch prediction unit 215 in response to mispredictions, as discussed in detail below.

Figure 3:
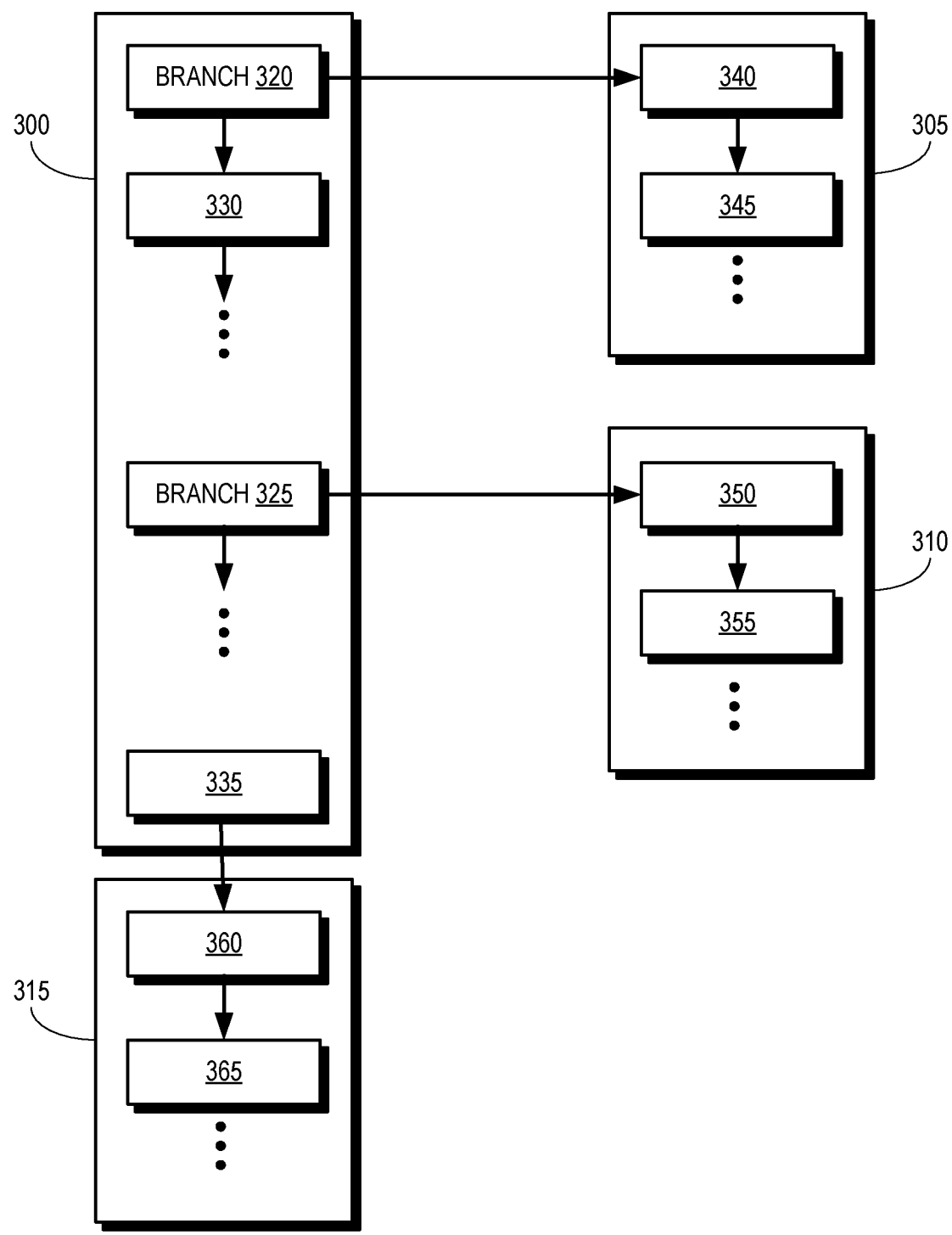
FIG. 3 is a block diagram of a prediction block and a set of blocks corresponding to different possible outcomes of branch instructions in the prediction block according to some embodiments.

FIG. 3 is a block diagram of a prediction block 300 and a set of blocks 305, 310, 315 corresponding to different possible outcomes of branch instructions in the prediction block 300 according to some embodiments. The prediction block 300 includes branch instructions 320, 325 and instructions 330, 335. Some embodiments of the prediction block 300 include additional branch instructions (not shown in FIG. 3 in the interest of clarity). The blocks 305, 310, 315 include instructions 340, 345, 350, 355, 360, 365, respectively. The block 305 is identified by a first address that is a target of the branch instruction 320, the block 310 is identified by a second address that is a target of the branch instruction 325, and the block 315 is identified by a third address subsequent to the branch instruction 325. In the illustrated embodiment, the third address is for a subsequent instruction at a boundary such as a cache line boundary between the blocks 300, 315, such as the instruction 360. In other embodiments, the third address is for a subsequent instruction in the block 300 such as the instruction 335.

A branch prediction structure such as the branch prediction unit 215 shown in FIG. 2 concurrently predicts outcomes of multiple branch instructions within the prediction block. In the illustrated embodiment, the branch prediction structure concurrently predicts outcomes of the branch instruction 320 and the branch instruction 325. The possible outcomes of the branch instruction 320 are "taken," in which case the program flow branches to a target address of the instruction 340 in the block 305, or "not taken," in which case the program flow continues sequentially to the instruction 330 in the prediction block 300. The possible outcomes of the branch instruction 325 are "taken," in which case the program flow branches to a target address of the instruction 350 in the block 310, or "not taken," in which case the program flow continues sequentially to the instruction 335 in the prediction block 300.

The predicted outcome of the branch 325 is stored in an alternate prediction storage array, e.g., an array that is implemented in the branch prediction unit 215 shown in FIG. 2. Some embodiments of the branch prediction structure store the predicted outcomes in response to the predicted outcome of the branch instruction 320 being taken. In that case, speculative execution branches to the instruction 340 in the block 305 and the program flow does not encounter the branch instruction 325. However, if the predicted outcome is mispredicted, fetching of the instructions is rolled back to the mispredicted branch instruction 320 and the branch predictor is restarted using the stored predicted outcome of the branch instruction 325. The latency required to recover from the misprediction is therefore reduced because the branch predictor is not required to re-predict the outcome of the branch instruction 325.

The instructions 340, 345, 350, 355, 360, 365 in the blocks 305, 310, 315 can include one or more branch instructions. In some embodiments, multiple instances of the conditional prediction logic are used to concurrently predict outcomes of the branch instructions in the blocks 305, 310, 315. For example, an address of the block 300 can be used to access information in a conditional branch predictor storage such as prediction information for the blocks 305, 310, 315. The multiple instances of the conditional prediction logic use the accessed information to predict outcomes of the branch instructions in the blocks 305, 310, 315. As discussed in detail below, speculative execution proceeds along a path including a predicted one of the blocks 305, 310, 315 and predicted outcomes of the branch instructions in the other blocks 305, 310, 315 are stored. In response to a misprediction of one or more of the branch instructions 320, 325, the stored outcomes are used to restart the conditional prediction logic, as discussed in detail below.

Figure 4:
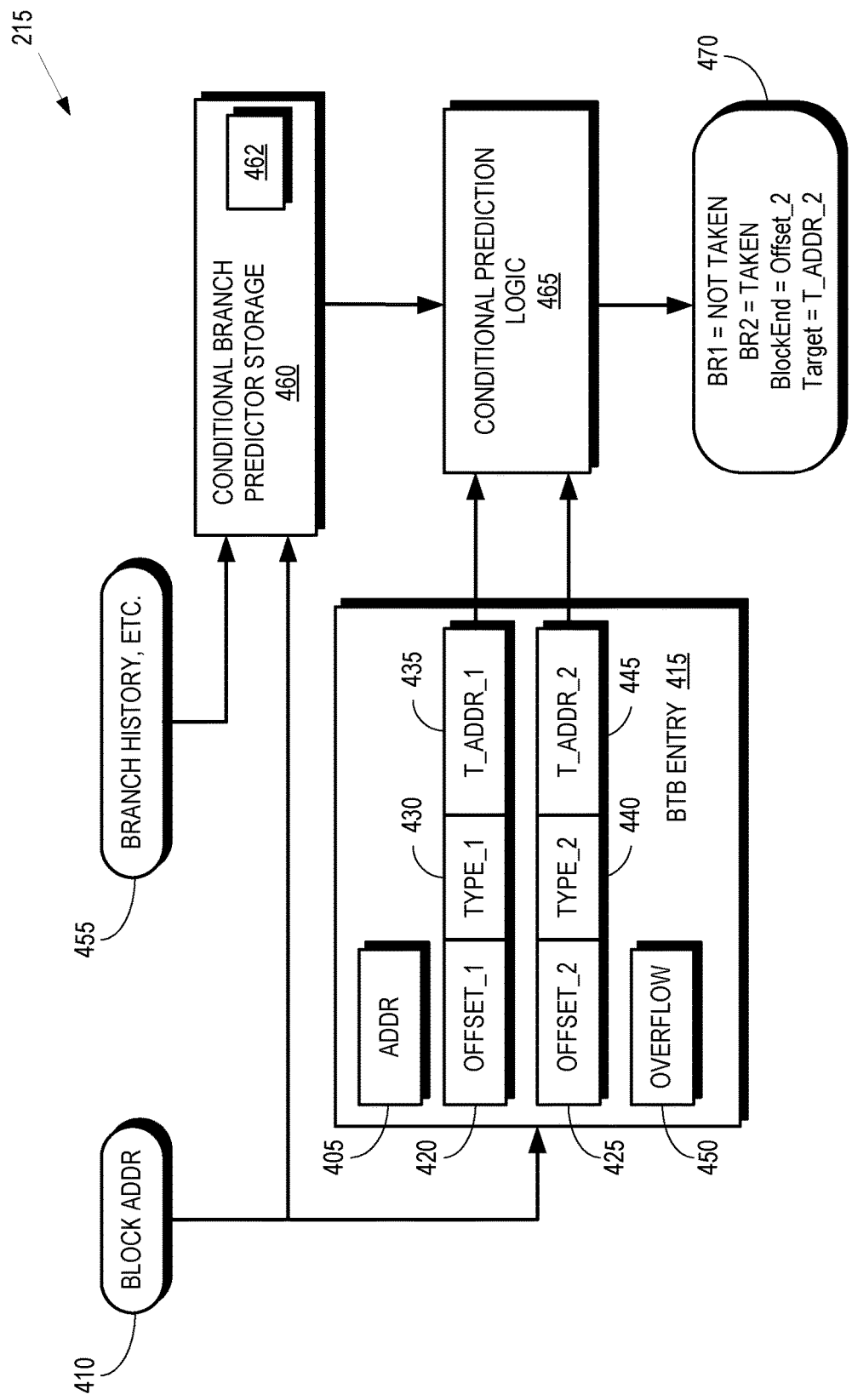
FIG. 4 is a block diagram of a portion of a processing system that includes a branch target buffer and a branch prediction structure according to some embodiments.

FIG. 4 is a block diagram of a portion of branch prediction unit 215 that includes a branch target buffer and a conditional branch predictor according to some embodiments. An address 405 indicates a starting address of a block of instructions. Entries in the branch target buffer are indexed by starting addresses of the blocks associated with the entries. In the illustrated embodiment, an index 410 to an entry 415 of the branch target buffer that includes branch prediction information for branch instructions in the block includes a value that is equal to the address 405. The index 410 is therefore used to access the entry 415 of the branch target buffer. For example, the address of the block 300 shown in FIG. 3 is used as an index into an entry of the branch target buffer that corresponds to the branches 320, 325 in the block 300.

The entry 415 includes branch prediction information for two branch instructions. For example, the entry 415 includes an offset 420 that indicates a location of a first branch instruction relative to the address 405 and an offset 425 that indicates a location of a second branch instruction relative to the address 405. The entry also includes information identifying types 430, 440 of the first and second branch instructions and the target addresses 435, 445 of the first and second branch instructions. The program flow branches from the first branch instruction to the target address 435 if the first branch instruction is taken. Otherwise, the program flow continues sequentially with instructions in the block until it reaches the second branch instruction. The program flow branches from the second branch instruction to the target address 445 if the second branch instruction is taken, otherwise the program flow continues sequentially with instructions in the block. An overflow indicator 450 indicates whether there are additional branch instructions before the next sequential boundary. In some embodiments, the sequential boundaries match the instruction cache line boundaries. In other embodiments, the sequential boundaries are set at other aligned addresses. The entry 415 shown in FIG. 4 is one example of an entry in a branch target buffer. Some embodiments of the entry 415 include different branch prediction information that is organized or structured in a different manner.

The branch prediction structure includes conditional branch predictor storage 460 and conditional prediction logic 465. The conditional branch predictor storage 460 stores information that is used to predict outcomes of branch instructions. The index 410 is provided to the conditional branch predictor storage 460 to access the stored information associated with the block indicated by the address 405. In some embodiments, additional information such as branch history information 455 is provided to the conditional branch predictor storage 460. The accessed information associated with the block beginning at the address 405 is provided to the conditional prediction logic 465, which also receives branch prediction information for the branch instructions in the block from the entry 415. The conditional prediction logic 465 uses the information accessed from the entry 415 and the conditional branch predictor storage 460 to predict outcomes of the branch instructions in the block. In the illustrated embodiment, the conditional prediction logic 465 predicts that the first branch instruction is not taken and the second branch instruction is taken. Thus, the conditional prediction logic 465 predicts that the end of the first block is at the location of the second branch instruction (OFFSET_2) and the target address of the second branch instruction is T_ADDR_2 as shown in block 470.

Some embodiments of the branch predictor storage 460 also include an alternate prediction storage array 462 that is used to store branch prediction information for a remainder block if one or more branches are predicted "taken." The branch prediction information includes information that describes a branch (if any) in the remainder block, a predicted conditional outcome of the branch, the predicted target of the branch, and the location of the end of the remainder block, or a similar representation of the same information. Branch prediction information associated with each prediction block in the alternate prediction storage array 462 is indexed based on the corresponding prediction block number. The branch prediction information stored in the alternate prediction storage array 462 is used to restart the branch predictor in the event of a misprediction, as discussed herein.

Figure 5:
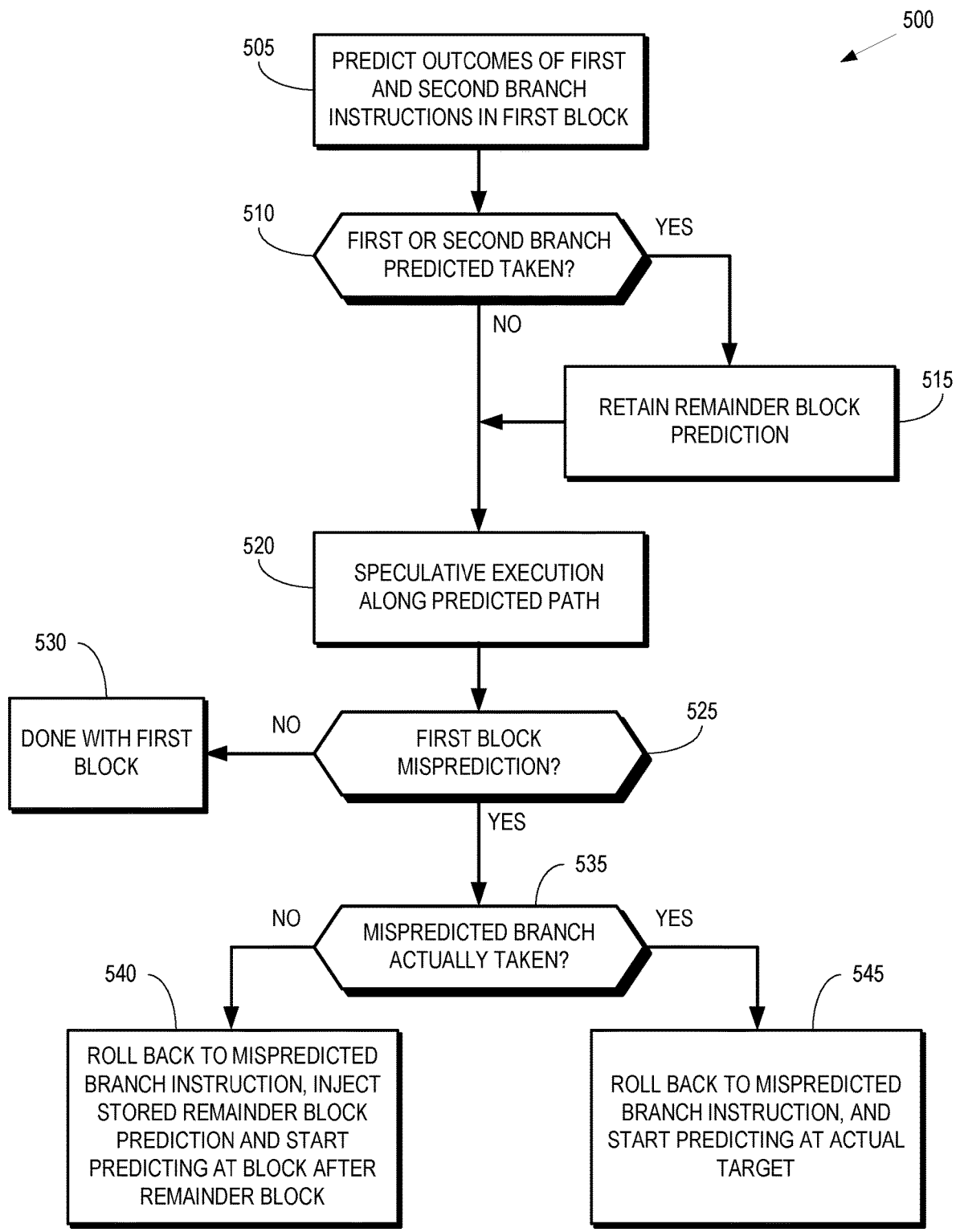
FIG. 5 is a flow diagram of a method of recovering from branch mispredictions using stored prediction information to reduce the latency of the branch prediction recovery according to some embodiments.

FIG. 5 is a flow diagram of a method 500 of recovering from branch mispredictions using stored prediction information to restart the branch prediction structure according to some embodiments. The method 500 is implemented in some embodiments of the processing system 100 shown in FIG. 1 and the portion 200 of the processing system shown in FIG. 2.

At block 505, a branch predictor concurrently predicts outcomes of first and second branches in a first block, which is referred to as a prediction block. The prediction block is also assigned a prediction block number, which is assigned in ascending order, wrapping to zero when the maximum number of stored prediction blocks is exceeded. The method 500 then flows to decision block 510.

At decision block 510, the branch predictor determines whether the first or the second branch instruction is predicted to be taken, e.g., the program flow is predicted to branch to a target address of the first branch instruction or the second branch instruction. If so, the method 500 flows to block 515 and a remainder block prediction is retained. For example, if the first branch instruction is predicted to be taken, the remainder block includes a predicted outcome of the second branch instruction even though the program flow will not encounter the second branch instruction if the branch predictor correctly predicted the outcome of the first branch instruction. Branch prediction information for the remainder block is written to the alternate prediction storage array. The method 500 then flows to block 520. If neither the first nor the second branch instruction is predicted to be taken, the method 500 flows directly to block 520.

At block 520, a fetch unit is instructed to begin fetching instructions for speculative execution along a path predicted by the branch predictor.

At decision block 525, the processing system determines whether outcomes of the first and second branch instructions in the first block were mispredicted. If not, and the branch predictor correctly predicted the outcomes of the first and second branch instructions, the method 500 flows to block 530 and processing of the first block by the branch predictor is done. If at least one of the outcomes of the first and second branch instructions in the first block were mispredicted, the method 500 flows to decision block 535.

At decision block 535, the processing system determines whether the mispredicted branch was actually taken, e.g., the branch predictor predicted that one of the branch instructions would not be taken and the actual outcome was that the branch instruction was taken and the program flow branch to the target address of the branch instruction. If not, the branch predictor predicted that the outcome would be that the branch was taken and the actual outcome is that the branch is not taken. The method 500 then flows to block 540. If so, the branch predictor predicted that the outcome would be that the branch was not taken and the actual outcome is that the branch is taken. The method 500 then flows to block 545.

At block 540, the program flow is rolled back to the mispredicted branch instruction. For example, if the branch predictor predicted that the first branch instruction would be taken and the actual outcome is that the first branch instruction is not taken, the program flow is rolled back to the first branch instruction and the fetch unit begins fetching instructions with the next instruction following the first branch instruction in the prediction block. The stored remainder block (from block 515) is read out of the alternate prediction storage array using the prediction block number of the mispredicted branch. The branch predictor is restarted based on the target of the stored second predicted outcome, which saves time by not having to re-predict the second branch. The remainder block prediction is injected into a later stage of the branch prediction pipeline so it can be communicated to the rest of the processor logic for use in fetching, decoding, and confirming the branch prediction as per normal mechanisms. Consequently, the branch predictor begins predicting at the next block, which is a block at the target address of the second branch instruction if the second branch instruction is predicted to be taken or a block subsequent to the second branch instruction if the second branch instruction is predicted to be not taken. Blocks that are subsequent to the second branch instruction include a block including an additional branch instruction in the prediction block (if the prediction block includes more than two branch instructions) or a block beginning at the next block boundary following the prediction block if there are no additional branch instructions in the prediction block.

At block 545, the program flow is rolled back to the mispredicted branch instruction and both branch prediction and instruction fetching begin at the actual target of the mispredicted branch instruction. For example, if the branch predictor predicted that the first branch instruction would not be taken and the actual outcome of the first branch instruction is taken, the program flow is rolled back to the first branch instruction and the fetch unit begins fetching instructions at the target address of the first branch instruction. The branch predictor also begins predicting outcomes of instructions at the block that begins at the target address.

Figure 6:
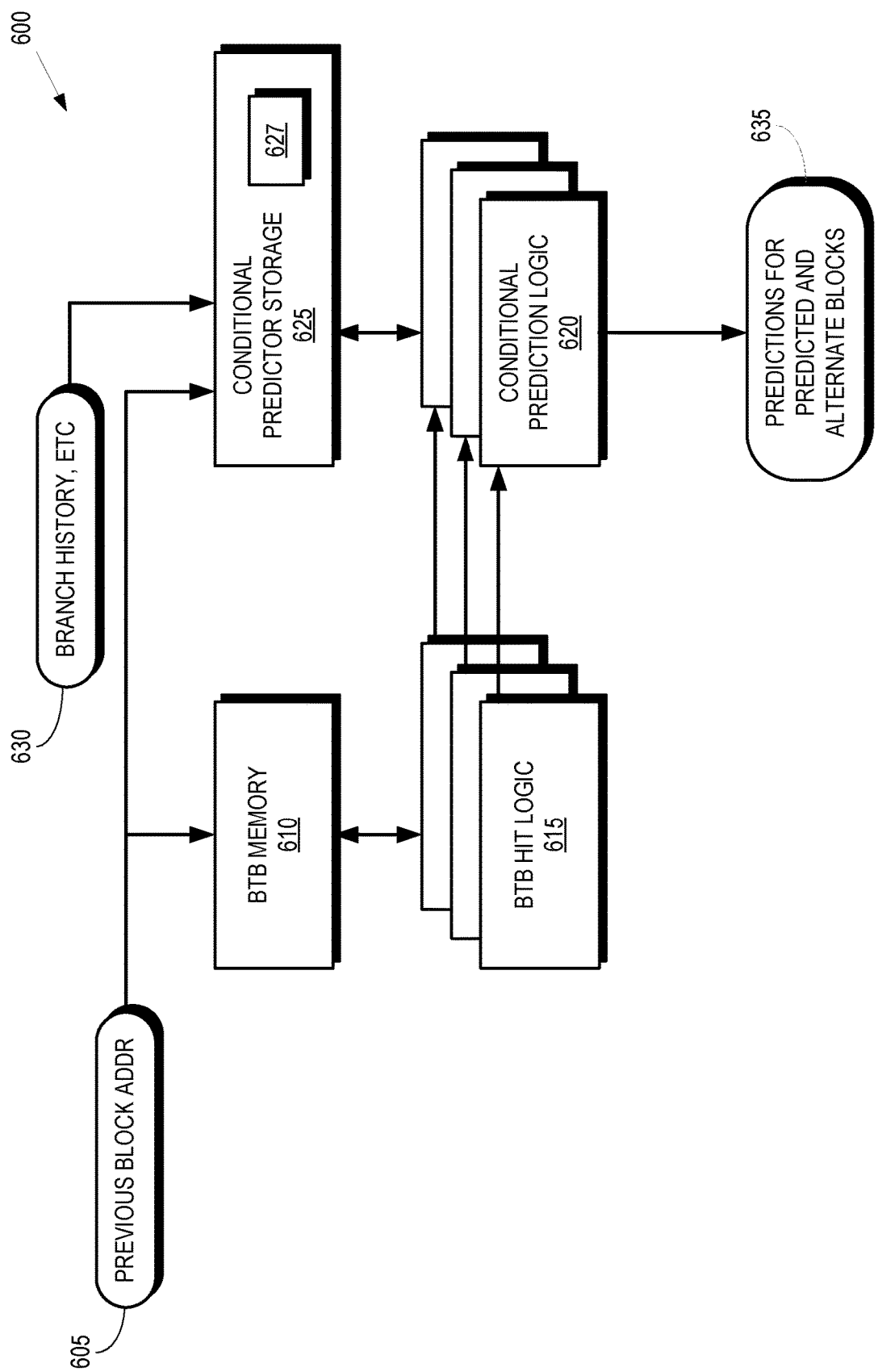
FIG. 6 is a block diagram of a portion of a processing system that implements "predict ahead" branch prediction according to some embodiments.

FIG. 6 is a block diagram of a portion 600 of a processing system that implements "predict ahead" branch prediction according to some embodiments. The portion 600 of the processing system is used to implement some embodiments of the processing system 100 shown in FIG. 1 and the portion 200 of the processing system shown in FIG. 2. The portion 600 of the processing system performs "predict ahead" branch prediction using a previous block address as an index 605 into a branch target buffer memory 610 to access branch prediction information for blocks associated with predicted outcomes of branch instructions within the previous block. In the illustrated embodiment, the portion 600 concurrently predicts outcomes of two branch instructions per block. However, some embodiments of the portion 600 concurrently predict outcomes of more branch instructions per block.

The index 605 is used to access entries in the branch target buffer memory 610 for three blocks that are associated with outcomes of the two branch instructions in the previous block. For example, there are three possible predicted outcomes for the first block: (1) first branch taken, (2) first branch not taken and second branch taken, or (3) both first and second branches not taken. The three possible outcomes correspond to three blocks associated with the index 605. For example, the block 305 corresponds to the first branch being taken at the branch instruction 320 in the block 300 shown in FIG. 3. The block 310 corresponds to the first branch being not taken at the branch instruction 320 and the second branch being taken at the branch instruction 325 in the block 300 shown in FIG. 3. The block 315 corresponds to both the first and second branches not being taken at the branch instructions 320, 325 in the block 300 shown in FIG. 3.

Some embodiments of the branch target buffer memory 610 implement associative access to the branch target buffer entries. For example, if the branch target buffer is 4-way set associative, then four entries are read out of the branch target buffer memory 610 based on the index 605. Multiple instances of branch target buffer hit logic 615 are used to compare tags of the blocks associated with outcomes of the branch instructions in the previous block to the tags in the entries that are read out of the branch target buffer memory 610. Each instance of the branch target buffer hit logic 615 separately compares a tag for one of the blocks to identify a predicted next (second) block and two alternate next (second) blocks. The second blocks are provided to corresponding instances of conditional prediction logic 620.

The portion 600 includes conditional branch predictor storage 625 that stores information that is used to predict outcomes of branch instructions. The index 605 is provided to the conditional branch predictor storage 625 to access the stored information associated with the second blocks indicated by the address of the previous block included in the index 605. In some embodiments, additional information such as branch history information 630 is provided to the conditional branch predictor storage 625. The accessed information associated with the set of second blocks is provided to the multiple instances of the conditional prediction logic 620, which also receive branch prediction information for the branch instructions in the corresponding second blocks from the multiple instances of the branch target buffer hit logic 615. The instances of the conditional prediction logic 620 use the information received from the corresponding instances of the branch target buffer hit logic 615 and the conditional branch predictor storage 625 to predict outcomes 635 of the branch instructions in the second blocks. As discussed herein, the outcomes 635 indicate whether branch instructions in each of the blocks are predicted to be taken or not taken, ending addresses of the second blocks, and addresses of subsequent instructions such as target addresses if a branch instruction is predicted to be taken.

Some embodiments of the branch predictor storage 625 include an alternate prediction storage array 627 that is used to store branch prediction information for a remainder block of the predicted block and the alternate blocks. The branch prediction information includes information that describes a branch (if any) in the remainder block, a predicted conditional outcome of the branch, the predicted target of the branch, and the location of the end of the remainder block, or a similar representation of the same information. Similar information is stored for the alternate blocks. For example, the alternate prediction storage array 627 can store information used to describe the branch(es), the predicted conditional outcome(s) of the branch(es), the target(s) of the branch(es), and the location of the end of the block, or a similar representation of the same information. Additionally, an indication is stored to indicate the outcome of the first block that corresponds to the alternate second block prediction. Branch prediction information in the alternate prediction storage array 627 is indexed based on corresponding prediction block numbers. The branch prediction information stored in the alternate prediction storage array 627 is used to restart the branch predictor in the event of a misprediction, as discussed below.

Figure 7:
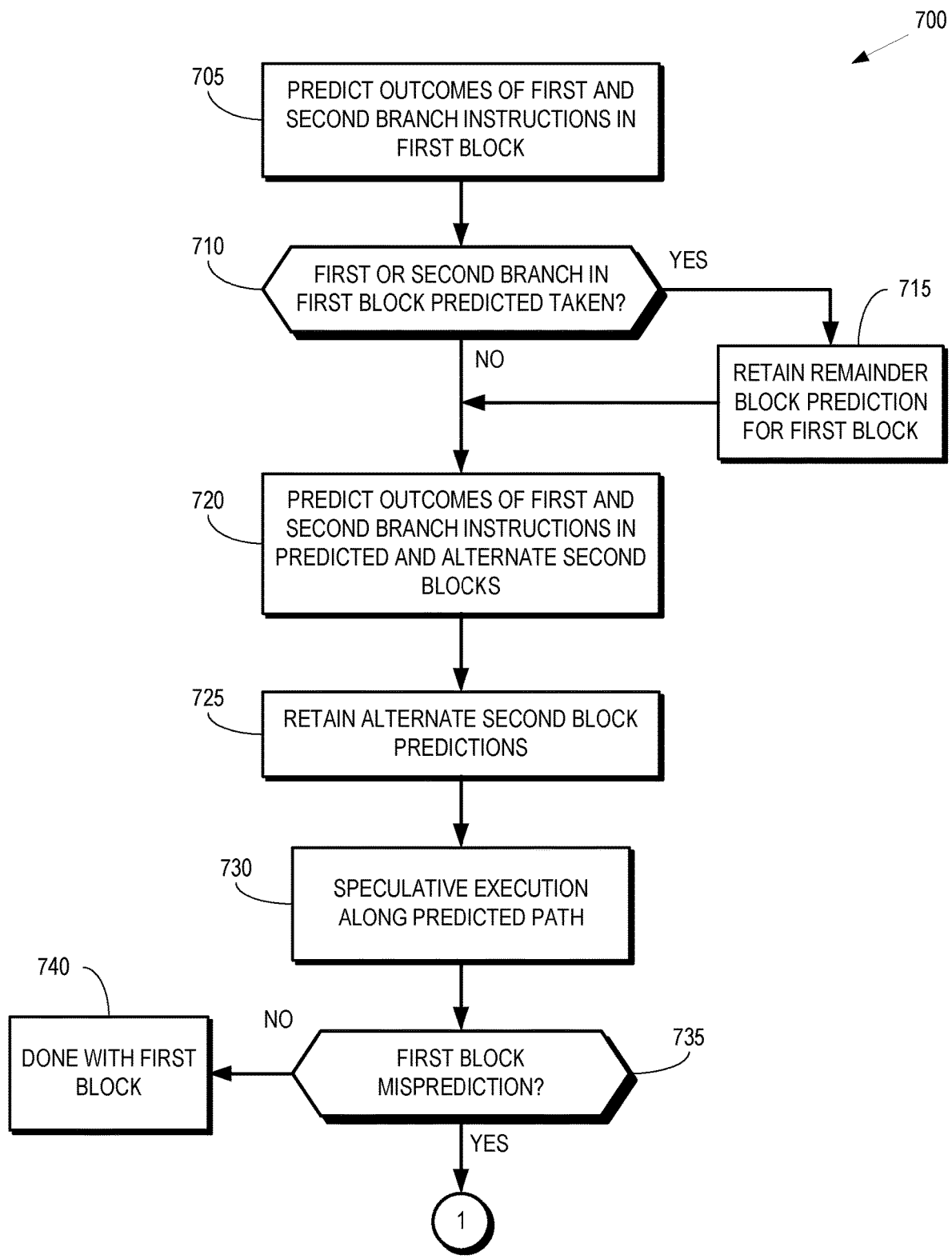
FIG. 7 is a flow diagram of a first portion of a method of recovering from branch mispredictions using stored prediction information to reduce the latency of the branch prediction recovery for "predict ahead" branch prediction according to some embodiments.

FIG. 7 is a flow diagram of a first portion 700 of a method of rolling back a program flow and a branch predictor in response to a branch misprediction during "predict ahead" branch prediction according to some embodiments. The first portion 700 of the method is implemented in some embodiments of the processing system 100 shown in FIG. 1 and the portion 200 of the processing system shown in FIG. 2.

At block 705, a branch predictor concurrently predicts outcomes of first and second branches in a first block. As discussed herein, different combinations of outcomes of the first and second branches in the first block correspond to different destination second blocks. The branch predictor identifies one of the second blocks as the "predicted" second block based on the predicted outcomes of the first and second branches. The second blocks corresponding to other outcomes are identified as "alternate" second blocks. The portion 700 of the method then flows to decision block 710.

At decision block 710, the branch predictor determines whether the first or the second branch instruction is predicted to be taken, e.g., the program flow is predicted to branch to a target address of the first branch instruction or the second branch instruction. If so, the portion 700 of the method flows to block 715 and a remainder block prediction is retained. For example, if the first branch instruction is predicted to be taken, the remainder block includes a predicted outcome of the second branch instruction even though the program flow will not encounter the second branch instruction if the branch predictor correctly predicted the outcome of the first branch instruction. The information about the remainder block is retained by writing it to the entry in the alternate prediction storage array corresponding to its prediction block number. The portion 700 of the method then flows to block 720. If neither the first nor the second branch instruction is predicted to be taken, the portion 700 of the method flows directly to block 720.

At block 720, multiple instances of conditional prediction logic are used to predict outcomes of first and second branch instructions in each of the predicted and alternate second blocks. In some embodiments, a first instance of the conditional prediction logic predicts outcomes of first and second branch instructions in the predicted second block, a second instance predicts outcomes of first and second branch instructions in one of the alternate second blocks, and a third instance predicts outcomes of first and second branch instructions in another one of the alternate second blocks. However, in other embodiments, some or all of the second blocks include more or fewer branch instructions.

At block 725, predictions of the outcomes of the branch instructions in the alternate second blocks are retained by writing the information to the entry in the alternate prediction storage array corresponding to the prediction block number of the first prediction block. The information that is stored is the information used to describe the branch(es), the predicted conditional outcome(s) of the branch(es), the target(s) of the branches, and the location of the end of the block, or a similar representation of the same information. Additionally, an indication is stored to indicate the outcome of the first block that corresponds to the alternate second block prediction.

At block 730, a fetch unit is instructed to begin fetching instructions for speculative execution along a path predicted by the branch predictor. In the illustrated embodiment, the fetch unit begins fetching instructions along a path that includes the predicted second block.

At decision block 735, the processing system determines whether outcomes of the first and second branch instructions in the first block were mispredicted. If not, and the branch predictor correctly predicted the outcomes of the first and second branch instructions, the portion 700 of the method flows to block 740 and processing of the first block by the branch predictor is done. If at least one of the outcomes of the first and second branch instructions in the first block were mispredicted, the portion 700 of the method flows to node 1.

Figure 8:
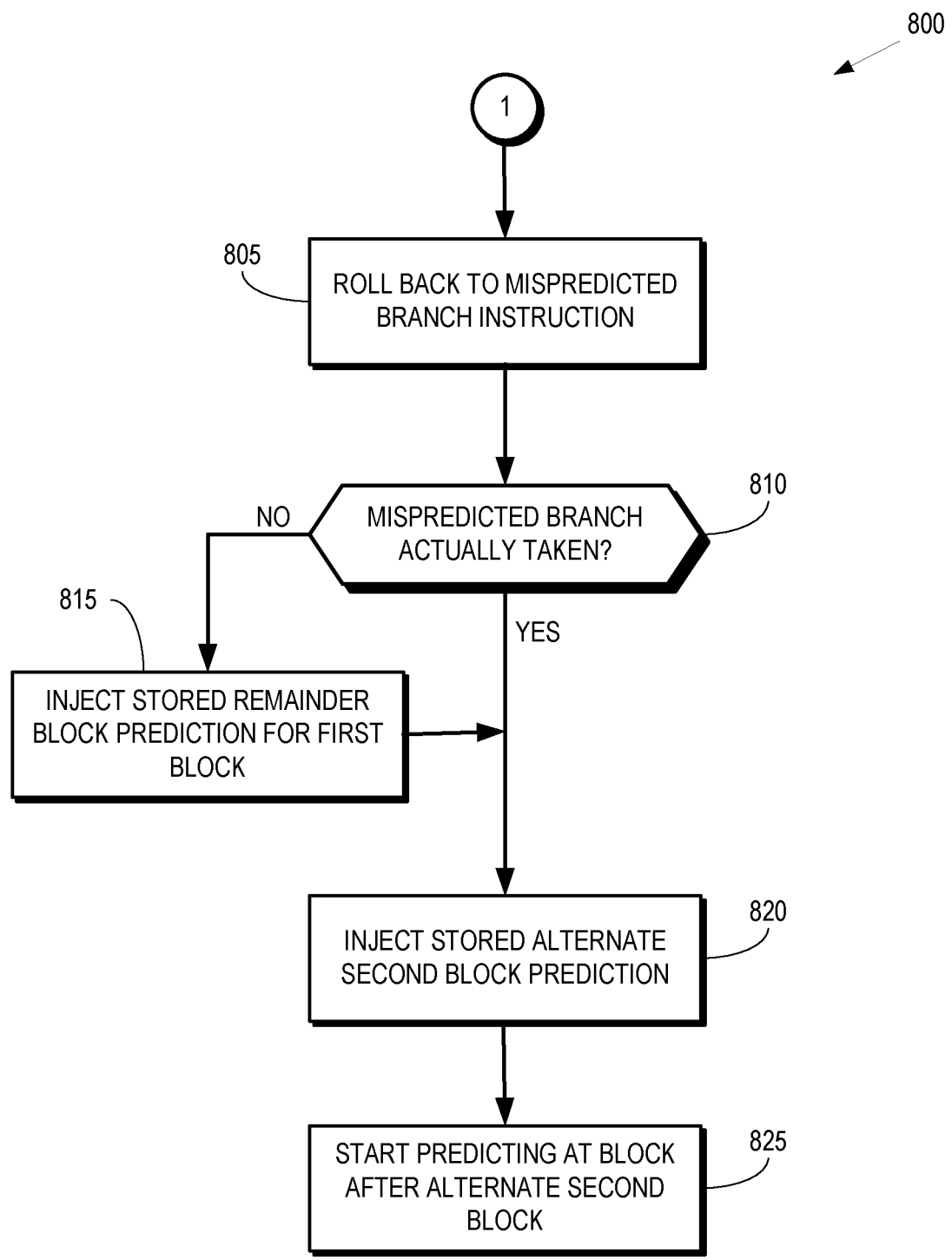
FIG. 8 is a flow diagram of a second portion of a method of recovering from branch mispredictions using stored prediction information to reduce the latency of the branch prediction recovery for "predict ahead" branch prediction according to some embodiments.

FIG. 8 is a flow diagram of a second portion 800 of the method of rolling back a program flow and restarting a branch predictor in response to a branch misprediction during "predict ahead" prediction according to some embodiments. The second portion 800 of the method is implemented in some embodiments of the processing system 100 shown in FIG. 1 and the portion 200 of the processing system shown in FIG. 2. The second portion 800 of the method begins at the node 1, which corresponds to the node 1 shown in FIG. 7.

At block 805, the program flow is rolled back to the mispredicted branch instruction, which can be either the first branch instruction or the second branch instruction in the first block.

At decision block 810, the processing system determines whether the mispredicted branch was actually taken, e.g., the branch predictor predicted that one of the branch instructions in the first block would not be taken and the actual outcome was that the branch instruction was taken and the program flow branched to the target address of the branch instruction. If not, and the branch predictor predicted that the outcome would be that the branch was taken and the actual outcome is that the branch is not taken, the portion 800 of the method flows to block 815.

At block 815, the stored remainder block for the first block (from block 715 in FIG. 7) is read out of the alternate prediction storage array using the prediction block number of the mispredicted branch. The remainder block prediction is injected into a later stage of the branch prediction pipeline so it can be communicated to the rest of the processor logic for use in fetching, decoding, and confirming the branch prediction as per normal mechanisms. Consequently, the branch predictor begins predicting at the next block, which is one of the alternate second blocks, e.g., a block at the target address of the second branch instruction if the second branch instruction is predicted to be taken or a block subsequent to the second branch instruction if the second branch instruction is predicted to be not taken. Blocks that are subsequent to the second branch instruction include a block including an additional branch instruction in the first block (if the first block includes more than two branch instructions) or a block beginning at the next block boundary following the first block if there are no additional branch instructions in the first block.

If the mispredicted branch was actually taken (as determined at decision block 810), and the branch predictor predicted that the outcome would be that the branch was not taken and the actual outcome is that the branch is taken, the portion 800 of the method flows to block 820.

At block 820, predictions of outcomes of the branch instructions in the alternate second block that correspond to the branch that is actually taken from the first block are injected into a later stage of the branch prediction pipeline (but only after the remainder prediction was injected, if applicable) so it can be communicated to the rest of the processor logic for use in fetching, decoding, and confirming the branch prediction as per normal mechanisms. Thus, the branch predictor does not need to repeat predictions of the second block in response to the branch misprediction.

At block 825, the branch predictor begins predicting outcomes of branch instructions in a block following the alternate second block. Some embodiments of the branch predictor begin predicting outcomes of branch instructions in a block that corresponds to a target address of a branch instruction in the alternate second block (if the branch instruction is predicted to be taken), an address of a subsequent branch instruction in the alternate second block (if there are additional branch instructions in the alternate second block and the branch instruction is predicted to be not taken), or an address of a subsequent branch instruction in a block that follows the alternate second block in sequence (if there are no additional branch instructions in the alternate second block and the branch instruction is predicted to be not taken).

A processing system that implements the illustrated embodiment of the method shown in FIGS. 7 and 8 stores predicted outcomes for all of the alternate second blocks. In other embodiments, less than all of the predicted outcomes are stored. For example, the processing system can store predicted outcomes for a single alternate second block. The alternate second block that is chosen for storage is selected based on likelihoods that the alternate second blocks will be on the actual path of the program flow, confidence measures, or using an arbitrary selection criterion such as selecting the first alternate second block in all cases. If a misprediction recovery in such an embodiment does not find the alternate prediction for the second block in the alternate prediction storage array, the branch predictor is restarted at the target of the first block instead of the target of the second block.

In some embodiments, the apparatus and techniques described above are implemented in a system including one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a branch predictor configured to predict a first outcome of a first branch instruction in a first block of instructions and to predict a second outcome for a remainder block of the first block of instructions;
an alternate prediction storage array in the branch predictor to selectively store the second outcome by:
storing the second outcome in response to the first outcome being taken, and
not storing the second outcome in response to the first outcome being not taken; and
fetch logic to, in response to the first outcome being a predicted to be taken and an actual outcome of the first branch instruction being not taken, restart the branch predictor based on the second outcome.

2. The apparatus of claim 1, wherein the branch predictor is configured to concurrently predict the first outcome of the first branch instruction and the second outcome, wherein the second outcome is for a second branch instruction in the remainder block of the first block of instructions.

3. The apparatus of claim 2, wherein the branch predictor is restarted to begin branch prediction at a second block identified by one of:

a target address of a second branch instruction in response to the second outcome indicating that the second branch instruction is taken; and an address of an instruction subsequent to the second branch instruction in response to the second outcome indicating that the second branch instruction is not taken and the first block including at least one third branch instruction.

4. The apparatus of claim 2, wherein the first block does not include a second branch instruction until a subsequent memory boundary, and wherein the remainder block of the first block includes information indicating that the first block does not include the second branch instruction until the subsequent memory boundary.

5. The apparatus of claim 4, wherein the branch predictor is configured to restart at the subsequent memory boundary indicated in the remainder block of the first block.

6. The apparatus of claim 1, further comprising:
a branch prediction structure configured to store a set of entries corresponding to a set of second blocks along speculative paths from the first block, wherein the branch predictor is configured to access the branch prediction structure using an address of the first block as an index.

7. The apparatus of claim 1, wherein, in response to the first outcome not being mispredicted, processing the first block of instructions.

8. A method comprising:
predicting, at a branch predictor, a first outcome of a first branch instruction in a first block of instructions and a second outcome for a remainder block of the first block of instructions;

selectively storing, in an alternate prediction storage array in the branch predictor, the second outcome, wherein selectively storing the second outcome comprises storing the second outcome in the alternate prediction storage array in response to the first outcome being taken, and not storing the second outcome in the alternate prediction storage array in response to the first outcome being not taken; and in response to the first branch instruction being predicted to be taken and an actual outcome of the first branch instruction being not taken, restarting the branch predictor based on the second outcome.

9. The method of claim 8, wherein selectively storing the second outcome comprises storing information indicating that the first block does not include any branch instructions until a subsequent memory boundary.

10. The method of claim 8, wherein multiple copies of branch predictor conditional logic are instantiated to concurrently predict outcomes of branch instructions in the first block of instructions.

11. The method of claim 8, further comprising:
responsive to the first outcome not being mispredicted, processing the first block of instructions.

12. The method of claim 8, further comprising:
concurrently predicting the first outcome of the first branch instruction and the second outcome, wherein the second outcome is for a second branch instruction in the first block of instructions.

13. The method of claim 12,
wherein restarting the branch predictor comprises restarting the branch predictor to begin branch prediction at a second block identified by one of:
a target address of a second branch instruction in the remainder block of the first block of instructions in response to the second outcome indicating that the second branch instruction is taken; and
an address of an instruction subsequent to the second branch instruction in response to the second outcome indicating that the second branch instruction is not taken and the first block including at least one third branch instruction.

14. The method of claim 8, wherein the first block does not include a second branch instruction prior to a subsequent memory boundary, and wherein the remainder block includes information indicating that the first block does not include the second branch instruction prior to the subsequent memory boundary.

15. The method of claim 14,
wherein restarting the branch predictor comprises restarting the branch predictor at the subsequent memory boundary indicated in the remainder block.

16. The method of claim 8, further comprising:
accessing information in a branch prediction structure using an address of the first block as an index, wherein the information comprises a set of entries corresponding to a set of second blocks along speculative paths from the first block.

17. The method of claim 8, wherein selectively storing the second outcome comprises storing information associated with the remainder block including information indicating the second outcome and a location of an end of the remainder block.

* * * * *